US011726862B1

(12) United States Patent
Maurice et al.

(10) Patent No.: US 11,726,862 B1
(45) Date of Patent: Aug. 15, 2023

(54) OVER-THE-AIR MACHINE LEARNING

(71) Applicant: Ayla Networks, Inc., Milpitas, CA (US)

(72) Inventors: Sebastian Maurice, Toronto (CA); Anirudha Deglurkar, San Jose, CA (US); Ronald Louis Maeder, San Jose, CA (US)

(73) Assignee: Ayla Networks, Inc., Milpitas, CA (US)

( * ) Notice: Subject to any disclaimer, the term of this patent is extended or adjusted under 35 U.S.C. 154(b) by 0 days.

(21) Appl. No.: 17/708,634

(22) Filed: Mar. 30, 2022

(51) Int. Cl.
*G06F 11/07* (2006.01)
*G06F 11/00* (2006.01)

(52) U.S. Cl.
CPC ........ *G06F 11/0793* (2013.01); *G06F 11/008* (2013.01); *G06F 11/0709* (2013.01)

(58) Field of Classification Search
CPC .. G06F 11/008; G06F 11/0709; G06F 11/079; G06F 11/0793
See application file for complete search history.

(56) References Cited

U.S. PATENT DOCUMENTS 10,452,458 B2 * 10/2019 Seto ..................... G06F 11/3409
2020/0065213 A1 * 2/2020 Poghosyan ............ G06N 3/044

OTHER PUBLICATIONS

Maurice, S. "Design and Analysis of an Intelligent Decision Support System for Trading and its Application to Electricity Trading," University of Calgary, Department of Electrical and Computer Engineering, Calgary, AB., Sep. 23, 2013, 221 pages.

* cited by examiner

*Primary Examiner* — Joseph R Kudirka
(74) *Attorney, Agent, or Firm* — Lowenstein Sandler LLP (57) ABSTRACT

A system receives a plurality of data streams, including a plurality of data points, associated with properties of a device. The system generates, for each data stream, a data set that includes at least a specified number of data points over a prior time period. The system identifies a first data stream that represents a property to be predicted for a future time period. The system generates a joined data set that includes a subset of the data sets not including a first data set of the first data stream. The joined data set and the first data set are inputted into a trained machine learning model, trained to output a predicted value of the first property for the future time period. The predicted value of the first property indicates an anomaly, and a resolution action for preventing the anomaly from occurring at the future time period is identified.

20 Claims, 6 Drawing Sheets

Receive a plurality of data streams associated with a device, wherein the plurality of data streams are associated with a plurality of properties of the device, wherein each data stream of the plurality of data streams comprises a plurality of data points. 405

Generate, for each data stream of the plurality of data streams, a data set comprising at least a specified number of data points of the plurality of data points over a prior time period. 410

Identify a first data set of a first data stream of the plurality of data streams, wherein the first data stream represents a first property of the plurality of properties to be predicted for a future time period. 415

Generate a joined data set comprising at least a subset of the data sets of the plurality of data streams, wherein the joined data set does not include the first data set of the first data stream. 420

Input the joined data set and the first data set into a trained machine learning (ML) model, wherein the trained ML model outputs a predicted value of the first property for the future time period. 425

Determine that the predicted value of the first property is indicative of an anomaly. 430

Determine a resolution action for preventing the anomaly from occurring at the future time period. 435

```
┌─────────────────────────────────────────────────────────────────────┐
│ Generate training data for a machine learning model associated with │
│ a device, wherein generating the training data comprises: 505       │
│ ┌─────────────────────────────────────────────────────────────────┐ │
│ │ Generating a training input comprising a first set of data      │ │
│ │ points associated with a plurality of properties of the device, │ │
│ │ wherein the first set of data points is collected during a      │ │
│ │ first time period. 510                                          │ │
│ └─────────────────────────────────────────────────────────────────┘ │
│                                 ▼                                   │
│ ┌─────────────────────────────────────────────────────────────────┐ │
│ │ Generating a target output for the training input, wherein the  │ │
│ │ target output comprises a second set of data points associated  │ │
│ │ with a particular property of the plurality of properties of    │ │
│ │ the device, wherein the second set of data points is collected  │ │
│ │ during a second time period, wherein the first time period      │ │
│ │ precedes the second time period. 515                            │ │
│ └─────────────────────────────────────────────────────────────────┘ │
└─────────────────────────────────────────────────────────────────────┘
                                  │
                                  ▼
┌─────────────────────────────────────────────────────────────────────┐
│ Train a plurality of machine learning models on (i) a set of        │
│ training inputs comprising the generated training input, and (ii) a │
│ set of target outputs comprising the generated target output,       │
│ wherein the machine learning model, once trained, is configured to  │
│ predict, for given data associated with the plurality of properties │
│ of the device during a third time period, data associated with the  │
│ particular property of the device at a fourth time period that is   │
│ subsequent to the third time period. 520                            │
└─────────────────────────────────────────────────────────────────────┘
                                  │
                                  ▼
┌─────────────────────────────────────────────────────────────────────┐
│ Determine an accuracy measure corresponding to each trained         │
│ machine learning model. 525                                         │
└─────────────────────────────────────────────────────────────────────┘
                                  │
                                  ▼
┌─────────────────────────────────────────────────────────────────────┐
│ Identify a first machine learning model of the plurality of trained │
│ machine learning models, wherein the first machine learning model   │
│ has a highest accuracy measure. 530                                 │
└─────────────────────────────────────────────────────────────────────┘
```

OVER-THE-AIR MACHINE LEARNING

TECHNICAL FIELD

Embodiments of the disclosure relate generally to machine learning, and more specifically, relate to an over-the-air machine learning (OTA ML) engine that combines data streams generated by IOT devices, with customized machine learning models for every individual IOT device.

BACKGROUND

The amount of data being generated in many modern systems is continuously expanding. For example, data reports associated with user devices (e.g., mobile phones) are being generated on a regular basis, such as daily or multiple times a day. Systems that receive these streams of data can adopt various approaches to process the data and implement processes in response to the received data.

BRIEF DESCRIPTION OF THE DRAWINGS

Reference will now be made to the accompanying drawings showing example embodiments of the present application.

DETAILED DESCRIPTION OF EMBODIMENTS

Embodiments described herein are directed to an over-the-air machine learning (OTA ML) engine that can generate, automatically, customized machine learning models for individual devices. Each customized machine learning model can be trained to predict a value of a property of the device, and can recommend an action for the predicted property value. The predicted value of the property can be indicative of a device anomaly, which can lead to device error, device failure, and/or suboptimal device performance. The anomaly can have a correlated resolution action that, when executed, can prevent the predicted anomaly from occurring. In embodiments, the customized machine learning model can preemptively resolve the anomaly corresponding to the predicted property value by automatically executing the corresponding resolution action. Device properties can be, for example, features of the device.

The OTA ML engine described herein can be applied in a variety of industries, including in telecommunications, Internet of Things (IoT), or any other system that includes multiple connected devices and/or one or more devices. Such devices can include mobile devices, devices with embedded systems (e.g., IoT enabled device, Internet accessible devices, gateway devices, routers, modems, cell phone towers, etc.), and/or other computing devices. The connected devices can communicate with cloud computing environments or other Internet accessible server systems via gateway devices. The gateway devices can communicate with an internet service provider (ISP) using a particular communication configuration protocol that specifies the sequence, format, and/or content of network communication messages as well as the configuration parameters, settings, etc., of the devices.

Devices can be affected by the environment in which they run. For example, a robotic vacuum that cleans a small apartment can function differently from a robotic vacuum that cleans a large multi-purpose room. While both devices share common features, each one will be affected differently by its environment. For example, the climate of the environment (e. g, temperature, humidity, air movement, etc.), the terrain of the environment (e.g., carpet, hardwood floor), the presence of pets, children, toys, furniture, food and drink, etc., can all have impact the performance of the device. Furthermore, devices are continuously generating large amounts of data, measured in terabytes, or petabytes. Due to the varied nature of the devices and the environments in which the devices reside, the data produced by each device may vary greatly. The data produced by a single device can also be highly non-linear, meaning that the amount and/or the type of data generated can change drastically from one time period to the next (e.g., from minute to minute).

Conventional systems may include a generic machine learning model in each device to help resolve potential performance issues. However, a generic machine learning model, not customized for each device, can produce unreliable predictions when distributed on a large scale to a number of devices. Conventional machine learning operates on a static, disk resident data, and requires human touchpoints, e.g., in model creation, model estimation, model fine tuning, a model deployment, making the machine learning models rigid and incapable of adapting quickly to big data. Implementing conventional machine learning systems on devices that produce big streams of non-linear, heterogeneous data can lead to a high number of unresolved performance issues and failures experienced by the device.

Aspects of the present disclosure, according to embodiments described herein, remedy the above-noted and other deficiencies by implementing over-the-air machine learning (OTA ML) to create a machine learning model specific to a particular device. The OTA ML can create millions of ML models using various machine learning algorithms on-the-fly, and select the most accurate ML model for each individual device. The ML models can be trained to predict a value of a property of the device. The predicted value can be indicative of an anomaly that is likely to occur at a future time period, such as a device failure, a device error, and/or suboptimal device performance. The ML model can identify a recommended resolution action intended to prevent the anomaly from occurring at the future time period. The resolution action can be, for example, a device reboot, switching the device to a low-power mode, and/or optimize the performance of the device by adjusting the device settings.

The OTA ML uses data streams generated by the device to create the multiple ML models optimized for the particular device. The OTA ML engine can be centrally located and can receive data streams from individual devices to which it is connected. Each device can generate multiple data streams. Data streams are a class of data that are continuously updated, continuously captured, and that continuously grow in volume.

Each data stream produced by a device can correspond to a property or feature of the device, and can include a series of property value data points. For example, the device can be a processing device installed in a motor vehicle, and the data streams generated by the device can include a stream of data points related to gas mileage values, a stream of data points related to the speed of the vehicle, a stream of data points related to the temperature of the engine, and/or a stream of data points related to GPS data. As another example, Internet service providers can capture data streams associated with users browsing the Internet. As yet another example, every time a user makes an online purchase, resulting data streams can include credit card information, purchase amount, produced purchased, time and date of purchase, location of purchase, etc. The data in each data stream can be non-linear, generating fluctuating amounts of data at various times throughout a day/month/year. A device can generate any number of data streams, and each data stream can include any number of data points. In embodiments, the data streams generated by a device can be stored in the cloud.

A device can have multiple properties that each generate a data stream. The OTA ML engine can receive these data streams, and can analyze the data in real-time (or near real-time) by training ML models to learn the underlying, and sometimes rapidly changing patterns in the streaming data. In embodiments, the OTA ML engine can generate training data that includes training input and target output. The training input can include a set of data points for each data stream collected during a prior time period. In embodiments, the OTA ML engine can generate data sets using a sliding window of historical data from each data stream. A data set can include the x most recent data points in a data stream, or can include the data points generated in the most recent specified time frame (e.g., the last 3 minutes). The OTA ML engine can combine the data sets to create a training dataset on which to train multiple ML models. In embodiments, the OTA ML engine can identify the dataset corresponding to the property of the device to be predicted, and can combine the data sets corresponding to the other properties of the device into a joined dataset. For example, if the device generates three data streams corresponding to three properties of the device, and the first property of the device is the property to be predicted by the ML model, the OTA ML engine can combine the second and third datasets to create the joined dataset. The OTA ML engine can then partition the datasets into training data, test data, and validation data, and use those datasets to train, test, and validate a number of ML models for a particular device.

In embodiments, the OTA ML generates target output for the training input that includes a second set of data points that are associated with a particular property of the device, i.e., the property to be predicted by the trained ML model. The second set of data points is collected during a time period that is subsequent to the time period during which the training input is collected. The OTA ML can then train an untrained machine learning model using the training input and the target output. The trained ML model can predict a value of the particular property of the device at a future time period.

The OTA ML engine can use the training data to train multiple ML models. The OTA ML engine can then test and validate each ML model to determine an accuracy measure (e.g., a confidence level, or a mean absolute percentage error) of each ML model. The OTA ML engine can identify a champion ML model as the ML model that has the highest accuracy measure. The OTA ML engine can then implement the champion ML model to predict anomalies, failures, and/or the health of the device. In embodiments, the OTA ML engine can combine the predictions of multiple devices in a system (e.g., an IoT mesh network) to determine the health of the system as a whole. For example, the OTA ML can isolate environments with IoT devices that are overactive and those that are dormant.

In embodiments, the OTA ML engine can train new ML models for a device on a determined schedule (e.g., every few minutes, or every 30 seconds), and/or in response to satisfying a condition (e.g., upon detecting an increase in the amount of data generated by a device). In some embodiments, the OTA ML can continuously train new ML models using the continuously generated data streams for a device. The OTA ML can generate updated training datasets that include the x most recent data points in the data streams received from the device, or the data points generated over the most recent specified time period. The OTA ML can identify the ML model of the newly trained ML models that has the highest accuracy measure. If the accuracy measure of the identified newly trained ML model exceeds the accuracy measure of the existing ML model for a particular device, the OTA ML can replace the existing ML model with the identified newly trained ML model. If the accuracy measure of the identified newly trained ML model is the same as or below the accuracy measure of the existing ML model for a particular device, the OTA ML can determine not to replace the existing ML model. In embodiments, the OTA ML can send the identified trained ML model to the device, and the device can install and the run the trained ML model. In some embodiments, the OTA ML can run the trained ML model and send the predicted value, corresponding anomaly, and/or recommended resolution action to the device.

Advantages of aspects of the present disclosure include, but are not limited to, providing deeper insights on every device in a fast timeframe. OTA ML reduces the need for human intervention associated with building conventional ML models, thereby improving speed and accuracy, and reducing costs. OTA ML can create millions of ML models specific to each device on-the-fly. By implementing the ML model with the highest accuracy measure, the OTA ML engine improves the predictions for each device. Improved predictions and recommended actions result in a reduction in unplanned downtime, a reduction in device and/or system failures, thus improving overall system performance. The OTA ML engine can implement recommended actions to resolve predicted failures before the failures occur, which can reduce exposure to feature anomalies and potential error conditions, thus improving the performance of each device and of the overall system. Such advantages can also lead to increased customer experience and reduced customer churn within the system.

Figure 1:
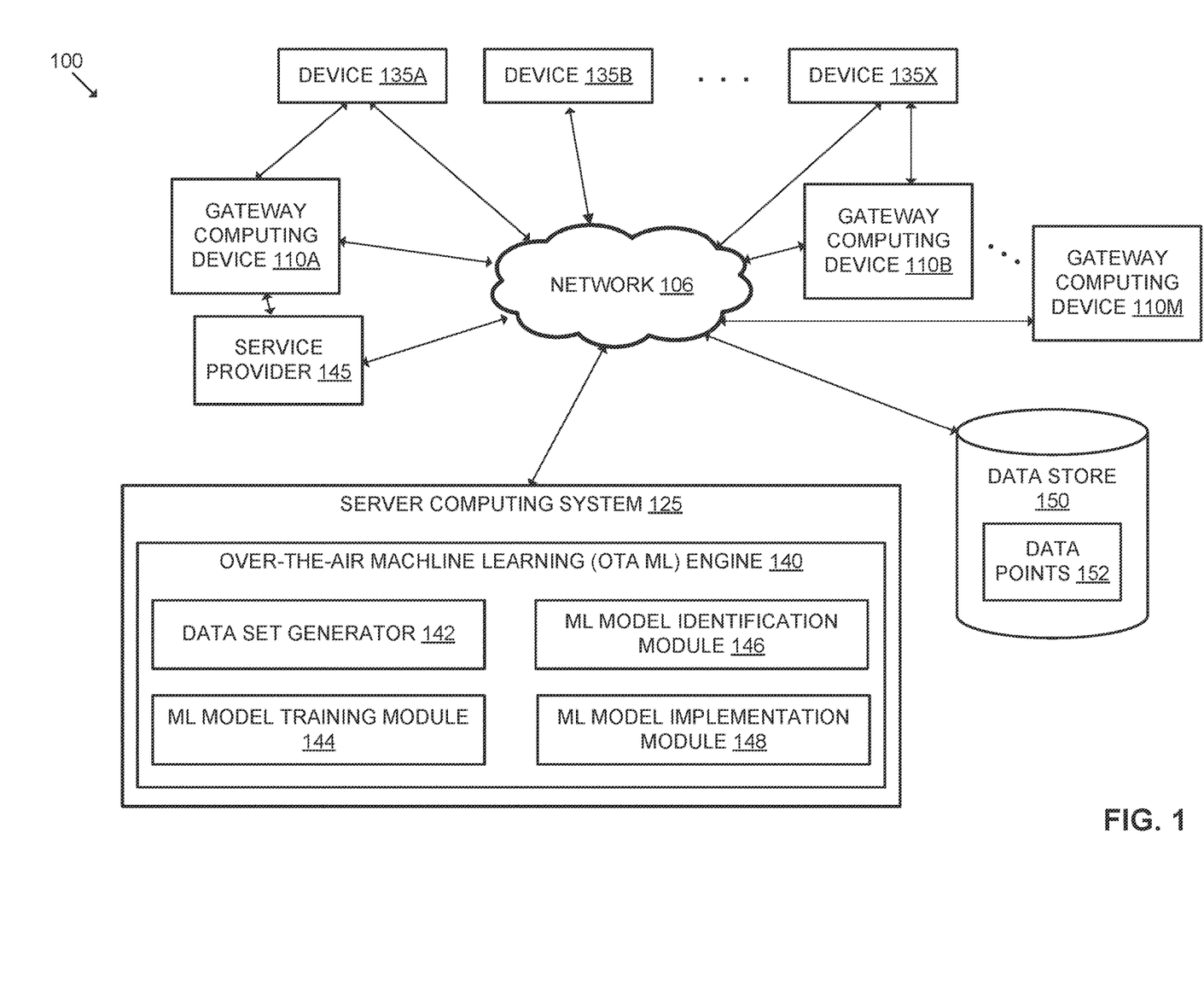
FIG. 1 is a block diagram depicting an example network architecture, in accordance with some embodiments of the present disclosure.

FIG. 1 is a block diagram depicting an example network architecture 100, in accordance with embodiments of the present disclosure. The network architecture 100 includes one or more devices 135A-X connected to a server computing system 125 via a network 106. Examples of devices 135A-X can include mobile client devices (e.g., mobile phones), IoT devices, and/or other client computing devices.

The devices 135A-X can connect directly to network 106, or can connect via one or more gateway computing device 110A-M. Gateway computing devices 110A-M can provide a connectivity point between two networks, or between devices (e.g., devices 135A-X and/or other gateway devices 110A-M) within the same network. Gateway computing devices 110A-N can be, for example, a router, a server, a firewall, or some other device that enables data to flow in and out of a network (e.g., network 106). In embodiments, gateway devices 110A-M can act as a translator, and may translate (or convert) received data into a particular format or communication protocol recognized by the devices 135A-X and/or other gateway devices 110A-M within the network.

Network 106 can include a local area network (LAN), which can include a router, switch, bridge or other network device (not shown) that enables communication between multiple devices (e.g., gateway computing devices 110A-M) connected to the LAN. The network device may provide wired connections to the LAN using, for example, Ethernet ports, universal serial bus (USB) ports and/or Firewire® ports. The network device may additionally provide wireless connections to the LAN using, for example, a Wi-Fi transceiver. In embodiments, network 106 can include a wide area network (WAN), which may be a private WAN (e.g., an intranet) or a public WAN such as the Internet, or may include a combination of a private and public network.

The network 106 may include or connect to a server provider 145. Service provider 145 can include any Internet Service Provider (ISP) that provides the gateway computing devices 110A-M with access to a WAN (e.g., Verizon®, Xfinity®, AT&T®, Sprint®, etc.). Service provider 145 can include one or more server computing devices to facilitate access to network 106. Service provider 145 can include configuration service (not pictured) that is responsible for configuring and/or managing communication with gateway computing devices 110A-M and/or devices 135A-X. In various implementations, the configuration service can establish a communication connection with a gateway computing device 110A-M to facilitate connectivity with network 106 as well as perform configuration operations on gateway computing device 110A-M to maintain stable communications with service provider 145.

In various implementations, the communication connection between the gateway devices 110A-M and the service provider 145 can utilize (or be associated with) a communication protocol for management of the gateway devices 110A-M (or other CPE) communicating with the service provider 145, as well as any additional devices associated with the gateway(s) (or other CPE) (e.g., devices 135A-X). The communication protocol can specify the type of data that can be passed between the service provider 145 and the gateway devices 110A-M using the communication connection. In other words, the protocol can specify one or more communication "features" for the communication connection between service provider 145 and the gateway devices 110A-M. In some instances, the communication features can include device attributes, device settings, configuration settings, communication connection information, or other types of data elements associated with the gateway devices 110A-M (or 135A-X). Additionally or alternatively, the communication features can include information associated with the communication connection itself.

The network 106 may additionally include or connect to server computing system 125. The server computing system 125 may include a physical machine and/or a virtual machine hosted by a physical machine. The physical machine may be a rackmount server, a desktop computer, or other computing device. In one embodiment, the server computing system 125 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing system 125 can host an over-the-air machine learning (OTA ML) engine 140. The OTA ML engine 140 can include a data set generator 142, a machine learning (ML) model training module 144, an ML identification module 146, and/or an ML model implementation module 148.

The devices 135A-X, 110A-M can generate and transmit streams of data containing values of data points corresponding to properties and/or features of the device. The data set generator 142 can receive data streams from the devices 135A-X, 110A-M. The data streams can include multiple data points. In embodiments, the devices 135A-X, 110A-M are sending data points to the server computing system 125 continuously. In embodiments, the data points can be stored in a data store 150, and data set generator 142 can retrieve data points 152 from data store 150.

The data set generator 142 can generate data sets for each data stream received from devices 135A-X, 110A-M. Each data stream can represent a feature or property of the device. For example, the device can be an IoT thermostat installed in a smart home. The properties of the thermostat can include temperature readings, humidity readings, network connectivity status, power status, etc. The processing device in the thermostat can generate data points corresponding to each property, and can send the data points to server computer system 125. As another example, a device can generate a data stream for each communication feature, including device attributes, device settings, configuration settings, communication connection information, or other types of data elements associated with the device.

Data set generator 142 can receive the data points from the data streams of devices 135A-X, 110A-M and create a data set for each property that includes a defined number of data points and/or that includes data points generated over a specified time period. The specified time period and/or the defined number of data points can be defined by user, e.g., in a configuration file included in the OTA ML engine 140. In embodiments, the specified time period and/or the defined number of data points can be adjusted by the OTA ML engine 140 based on the output of the ML model implementation module 148, as further described below.

The data set generator 142 can normalize the data sets for the device, e.g., by ensuring that each data set has the same number of data points. For example, device 135A can generate three data streams. Data set generator 142 can generate a data set for each of the three data stream, containing data points generated over the specified time period. For example, each data set includes the data points that were generated in the last 30 minutes. The first data stream for device 135A may have generated 15 data points in the last 30 minutes, while the second and third data streams for device 135A may have generated 19 data points in the last 30 minutes. In generating the data sets for device 135A, data set generator 142 can select the 15 most recent data points from each data stream to ensure that each data set has the same number of data points.

In embodiments, rather than generating a data set for each data stream covering a specified time period, the data set generator 142 can generate a data set for each data stream containing a specific number of data points generated over a prior time period. The specified number of data points can be set by a user, for example, in a configuration file. In some embodiments, the specified number of data points can be adjusted by the OTA ML engine 140 based on the output of the ML model implementation module 148, as further described below. For example, the data set generator 142 can generate a data set for each data stream that includes the x most recent data points generated by the corresponding data stream, where x is an integer greater than zero.

The data set generator 142 can identify the data stream that represents the property to be predicted by the ML model. The property to be predicted can be specified in the configuration file, for example, or can be received as input from a user of device 135A-X, 110A-M. The data set generator 142 can generate a joined data set that includes the data sets of the data streams for a device not including the data set that represents the property to be predicted.

The machine learning (ML) model training module 144 can receive (or retrieve) the data sets generated by data set generator 142. ML model training module 144 can train multiple machine learning models to predict a value of the property to be predicted as a function of the joined data set. The ML model training module 144 can use supervised or unsupervised learning to train multiple ML models. The training data set for training the ML models can include the joined dataset generated by data set generator 142, as well as the dataset corresponding to the device property to be predicted. Example workflows for training an ML model is described in further detail with respect to FIGS. 3 and 5. The ML model training module 144 can split the generated datasets into training data, testing data and validation data. The ML training module 144 can determine an accuracy measure for each of the multiple trained ML models for a device. The accuracy measure can be a confidence score of the ML model, and/or the mean absolute error percentage, for example. Other accuracy measures not listed here can be used. In embodiments, the ML model training model 144 is continuously training new ML models for devices 135A-X, 110A-M using the continuously generated data streams from devices 135A-X, 110A-M.

For each device 135A-X, 110A-M, the ML model identification module 146 can identify the ML model that has the highest accuracy measure. In embodiments, the ML model identification module 146 can use the mean absolute percentage error (MAPE) as the accuracy measure. That is, the ML model identification module 146 can identify the MAPE for each ML model trained by the ML model training module 144, and the ML model identification module 146 can identify the ML model with the highest MAPE score. The ML model with the highest score is the most accurate ML model for the corresponding device.

The ML model implementation module 148 can implement the ML model identified by the ML model identification module 146. Example workflows for implementing an ML model is described in further detail with respect to FIGS. 2 and 4. In embodiments, the device 135A-Z, 110A-M can have an existing ML model predicting the property value. That is, the OTA ML engine 140 has previously trained multiple ML models and implemented the ML model with the highest accuracy measure. In such a case, the ML model implementation module 148 can compare the accuracy measure of the newly trained ML model with the highest accuracy measure to the accuracy measure of the existing ML model. If the newly trained ML model is just as accurate or less accurate than the existing ML model, the ML model implementation module 148 can determine not to implement the newly trained ML model. If the newly trained ML is more accurate than the existing ML model (e.g., the accuracy measure of the newly trained ML model is higher than the accuracy measure of the existing ML model), the ML model implementation module 148 can execute the newly trained ML model.

To execute the newly trained ML model, the ML model implementation module 148 can associate the newly trained ML model with the corresponding device 135A-Z, 110A-M. The data set generator 142 can generate updated datasets from data streams received from device 135A-X, 110A-M. The updated datasets can include the x most recent number of data points, and/or the data points generated in the most recent specified time period. The number of data points and/or the specified time period to include in the datasets can be adjusted by user input, and/or by the OTA ML engine 140 itself. For example, the OTA ML engine 140 can determine that a device has not generated a sufficient number of data points in the specified time period (i.e., the number of data points generated in the specified time period is below a threshold number), and can determine to increase the specified time period. Conversely, the OTA ML engine 140 can determine that a device has generated too much data points in the specified time period, and can determine to decrease the specified time period. As another example, the OTA ML engine 140 can analyze the values of the data points received from a device, and can determine the x number of data points received do not satisfy a condition (e.g., the received data points are too similar to each other), which can result in inaccurate predictions. For example, if the dataset includes a values within a particular limited range, the trained ML model may only predict values within that range, which may not be helpful in predicting potential device errors, failures, and/or optimal device settings. Thus, the OTA ML engine 140 can determine to increase the number of data points in the dataset.

The ML model implementation module 148 can generate an updated joined data set by combining the update datasets corresponding to the properties of the device that are not to be predicted. To execute the identified ML model, the ML model implementation module 148 can then provide the updated joined dataset, as well as the updated dataset corresponding to the property to be predicted, as input to the identified ML model. The ML model implementation module 148 can then receive, as output from the identified ML model, the predicted value for the corresponding property to be predicted. The ML model implementation module 148 can identify an anomaly corresponding to the predicted value, and/or a resolution action for preventing the anomaly from occurring at a future time period. The ML model implementation module 148 can provide, to the corresponding device, an notification that includes the predicted value, the corresponding anomaly, and/or the recommended resolution action. In embodiments, ML model implementation module 148 can provide an instruction to execute the resolution action.

In embodiments, the resolution actions and/or anomalies can be stored in a table in data store 150. The anomalies can include device failure, device error, suboptimal device performance (e.g., slow performance, reaching a storage capacity threshold), or some other device anomaly. The resolution actions can include, for example, a device reboot, an adjustment to a settings value of the device, device software updates, hardware resource reallocation, etc. The anomalies and/or resolution actions can be linked to certain property values, such that when an ML model predicts a certain property value (or when an ML model predicts a property value within a certain range), the ML model implementation module 148 can identify the corresponding anomaly and/or resolution action. In embodiments, the ML model implementation module 148 can execute the resolution action, can schedule the execution of the resolution action within a future timeframe, and/or can send a recommendation to the corresponding device to perform the resolution action.

In embodiments, the ML model is trained to output the anomaly and/or the recommended resolution action along with (or instead of) the predicted property value. That is, the training datasets used to train the ML models can include corresponding anomalies and/or actions taken to resolve certain property value anomalies. Thus, the ML model can output the action corresponding to the predicted property value.

In embodiments, the ML model implementation module 148 sends the trained ML model to the corresponding device 135A-X, 110A-M, and the corresponding device 135A-X, 110A-M installs and runs the trained ML model.

In embodiments, the server computing system 125 can include a master OTA ML engine (not pictured) that receives outputs from multiple OTA ML engines 140. The master OTA ML engine can monitor multiple systems using an agent-based architecture. In embodiments, the master OTA ML engine can be trained on training data that includes the outputs of multiple OTA ML engines 140 as training input, and measured system health status as the target output. Measured system health statuses can include, for example, a number of devices 135A-X, 110A-M in a system that predict a particular property value exceeds a corresponding threshold (e.g., more than a certain percentage of the devices in a system predict being overloaded with incoming requests, or more than a certain number of devices in the system predict being overheated), or a number of devices 135A-X, 110A-M in a system recommend a device reboot to prevent a prediction from occurring. It should be noted that many other examples of measured system health status are envisioned. The master OTA ML can be trained to received, as input, the outputs from multiple OTA ML engines 140, and output an overall systems health status.

Figure 2:
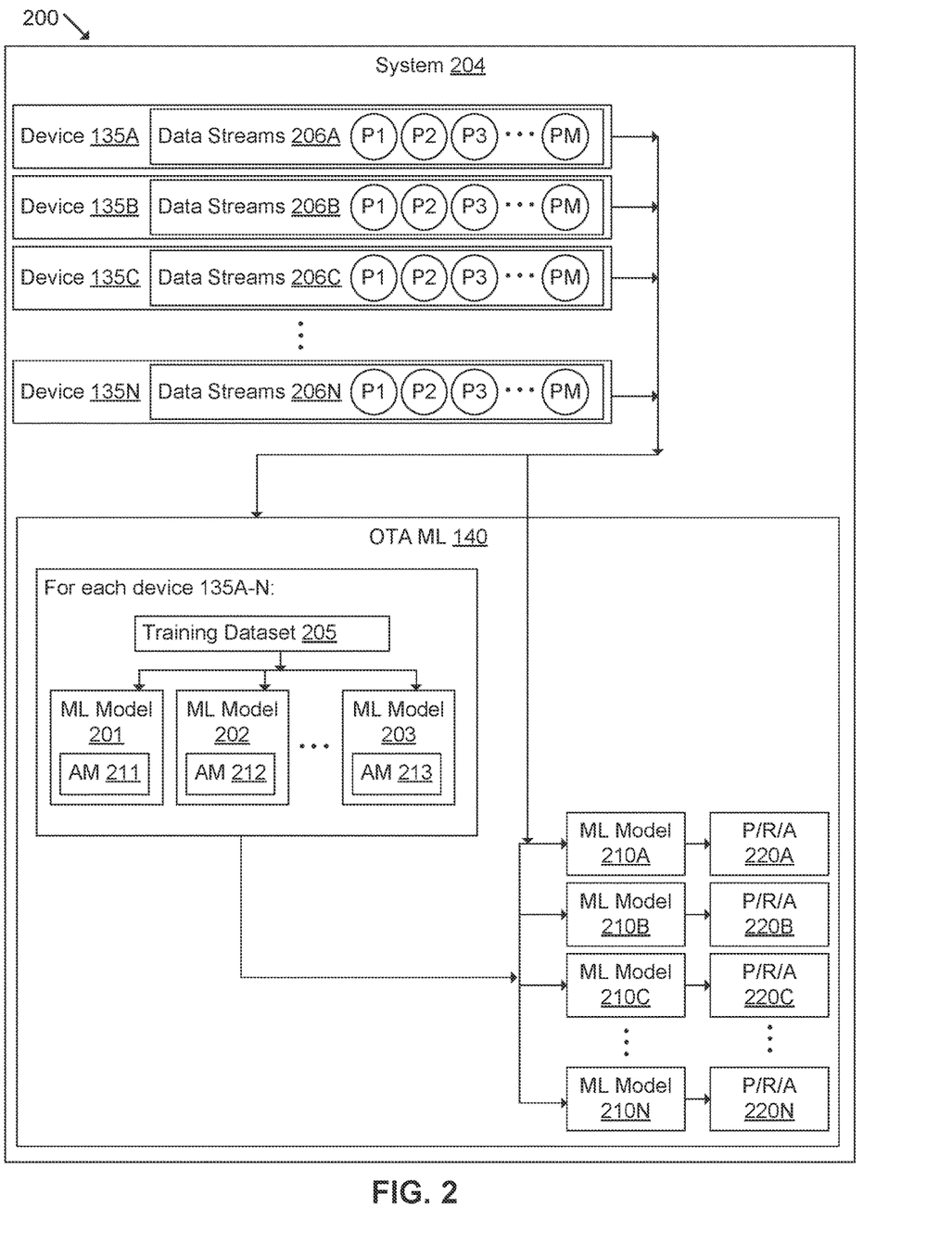
FIG. 2 illustrates a workflow for implementing an over-the-air machine learning engine, in accordance with some embodiments of the present disclosure.

FIG. 2 illustrates a workflow 200 for implementing an OTA ML engine, in accordance with some embodiments of the present disclosure. In embodiments, workflow 200 can be implemented by a server computing system 125 of FIG. 1.

A system 204 can include any number of connected devices 135A-N. The system 204 can be, for example, a mesh network, an IoT system, or a computing system. In embodiments, the system 204 can represent a home or a business with multiple connected devices 135A-N. Devices 135A-N can be similar to devices 135A-X, 110A-M described with respect to FIG. 1. Devices 135A-N can include, for example, IoT devices, gateway computing devices, devices within a mesh network, mobile devices, or some other computing device. Devices 135A-N can generate data streams 206A-N corresponding to various properties of the particular device. That is, device 135A can generate a data stream P1 that corresponds to a first property of device 135A, generate a data stream P2 that corresponds to a second property of device 135A, generate a data stream P3 that corresponds to a third property of device 135A, etc. Each data stream P1-PM can include any number of data points (i.e., values of the property).

The data streams 206A-N can be provided as input to the OTA ML engine 140. The OTA ML engine 140 can use the training dataset to train any number of ML models 201-203. While three ML models 201-203 are illustrated in FIG. 2, the OTA ML engine 140 can train thousands of ML models 201-203. The ML models 201-203 may be neural networks, deep learning models, decision trees, random forest models, support vector machines, regression models and/or other types of machine learning models. Example workflows for training an ML model is described in further detail with respect to FIGS. 3 and 5. The OTA ML can use training dataset 205 to train one or more ML models 201-203. The machine learning models 201-203 may be trained, for example, to output predictions of values of one or more properties of the corresponding device, to output an anomaly corresponding tot eh predicted property value(s), and/or to output a resolution action to prevent the anomaly from occurring.

In one embodiments, generating a training dataset 205 for each device 135A-N includes gathering data points from data streams 206A-N. To effectuate training, the training dataset 205 is provided as input into untrained ML models. OTA ML 140 trains the untrained machine learning models based on the training dataset 205 to generate multiple ML models 201-203. Each ML model 201-203 can be trained using a different algorithm.

Each ML model 201-203 can have a corresponding accuracy measure (AM) 211-213. The accuracy measure 211-213 can be, for example, a mean absolute error percentage (MAPE). MAPE measures the accuracy of the ML model as a percentage, and can be calculated as the average absolute percentage error for each time period minus actual values divided by actual values. For n number of fitted points, MAPE can be calculated as follows:

$$MAPE = \frac{1}{n}\sum_{t=1}^{n}\left|\frac{A_t - F_t}{A_t}\right|$$

where $A_t$ is the actual value and $F_t$ is the forecast value.

The OTA ML engine 140 can compare the AM 211-213 to identify the most accurate ML model 201-203. The ML model 201-203 with the highest AM 211-213 is the most accurate. The OTA ML engine 140 can then output the identified most accurate ML model for each device 135A-N. As illustrated in FIG. 2, the most accurate ML model for device 135A is ML model 210A; the most accurate ML model for device 135B is ML model 210B; the most accurate ML model for device 135C is ML model 210C; and the most accurate ML model for device 135N is ML model 210N.

In embodiments, the OTA ML engine 140 is continuously receiving updated data points from data streams 206A-N. On a predetermined schedule (e.g., every few minutes or hours), and/or on-demand (e.g., responsive to a user request, responsive to satisfying a criterion), the OTA ML engine 140 can generate newly trained ML models 201-203. The OTA ML engine 140 can identify one of the newly trained ML models 201-203 that has the highest accuracy measure 211-213. If the highest accuracy measure 211-213 of the newly trained ML model 201-203 is the same or lower than the accuracy measure of the previously trained and selected ML model 210A-N, the OTA ML engine 140 can determine not to replace the currently executing ML model 210A-N. Conversely, if the highest accuracy measure 211-213 of the newly trained ML model 201-203 is the greater than the accuracy measure of the previously trained and selected ML model 210A-N, the OTA ML engine 140 can output the newly trained ML model 201-203 with the highest AM 211-213, and replace the previously trained ML model 210A-N.

Once the ML models 210A-N are trained and identified with the highest accuracy measure 211-213, the devices 135A-N can send the data streams 206A-N directly to the trained ML models 210A-N. In some embodiments, the devices 135A-N continue to send the data streams 206A-N to the OTA ML engine 140, and the OTA ML engine 140 transmits the data streams 206A-N to the corresponding trained ML models 210A-N. The OTA ML engine 140 can generate data sets to provide as input to the trained ML models 210A-N. The data sets can include the specified number of data points (i.e., the x most recent data points in the data streams 206A-N), or the data points generated in the most recent specified time period (i.e., in the last 3 minutes, or the last hour). The trained ML models 210A-N can output a prediction/resolution/action 220A-N for the corresponding device 135A-N. The prediction can include the predicted value of the device property and/or a corresponding anomaly, and resolution can be a recommended resolution action to prevent the anomaly from occurring (or to prevent the device property from reaching the predicted value), and the action can be the instruction to execute, schedule, or notify the device of the prediction, anomaly, and/or resolution action. That is, the OTA ML engine 140 can then implement the prediction/resolution/action 220A-N by executing the action, scheduling the action to be executed within a certain timeframe, and/or sending a recommendation to the corresponding device 135A-N to implement the recommended action. The system 204 can have a predetermined maintenance time period window during which resolution actions may be performed. For example, resolution actions that include a device reboot may be limited to execution between 2 am and 5 am to avoid customer disruption.

In embodiments, the OTA ML engine 140 can include a system-wide health status module (not pictured) that can determine the status of the system 204 as a whole. The system-wide heath status module can receive outputs from at least one of the ML models 210A-N, and combine the received predictions/recommendations/actions 220A-N. The system-wide health status module can analyze the combined predictions/recommendations/actions 220A-N to determine the status of the system 204. For example, system 204 can be a mesh network, and the system-wide health status module can receive, as outputs from multiple ML models 210A-N, predictions/recommendations/actions 220A-N related to a predicted increase in number of incoming requests directed to the devices 135A-N. The system-wide health status module can predict, based on the received P/R/A 220A-N, that the system 204 may soon be overloaded, and can take appropriate action to resolve the predicted issue.

Figure 3:
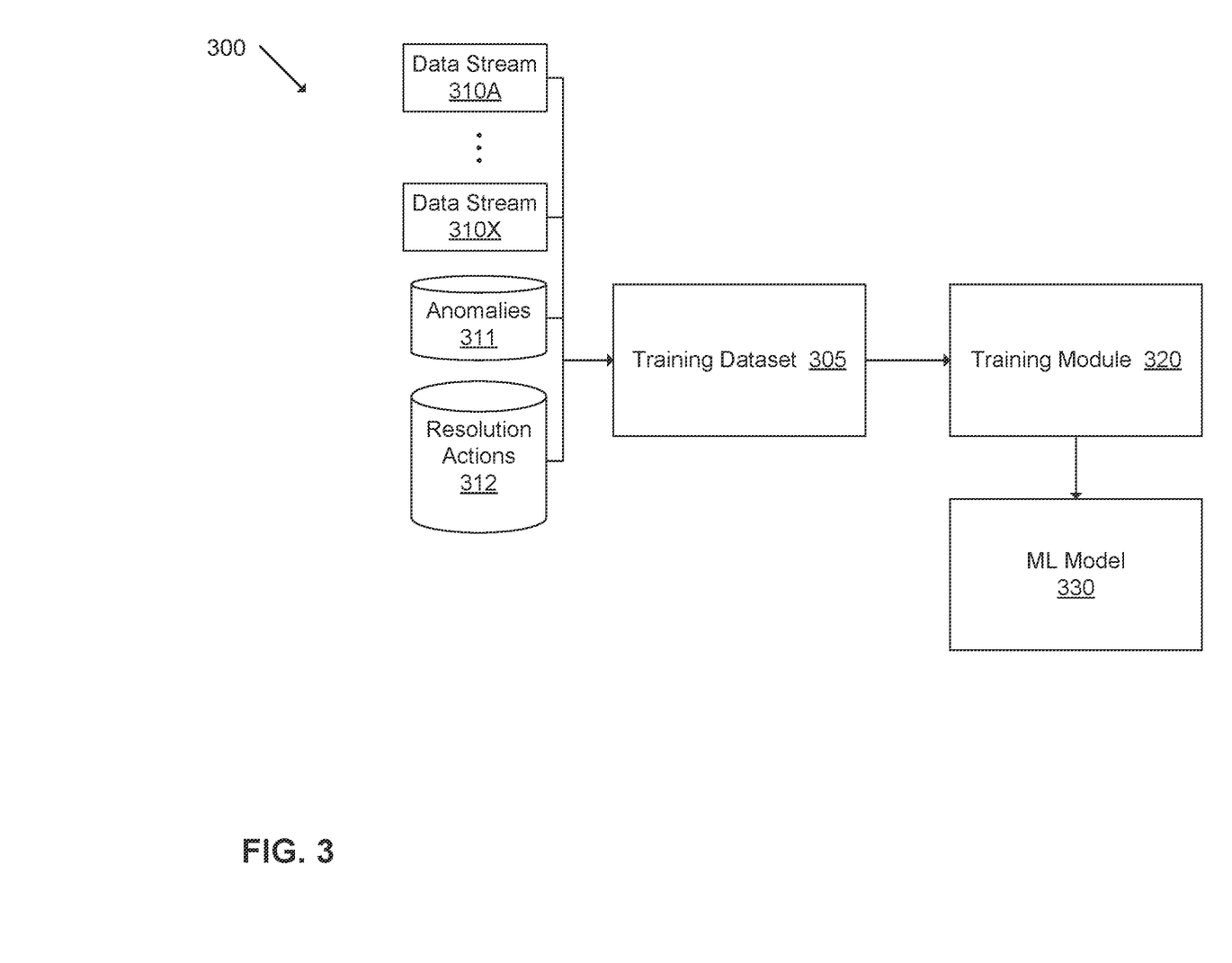
FIG. 3 is a workflow for training a machine learning model using over-the-air machine learning, in accordance with some embodiments of the present disclosure.

FIG. 3 illustrates a workflow 300 for training a machine learning model using OTA ML, in accordance with embodiments of the present disclosure. The workflow 300 may be performed by processing logic executed by a processor of a computing device. The workflow 300 may be implemented, for example, by one or more modules OTA ML 140 executing on a processing device 502 of computing device 500 show in FIG. 5. Additionally, FIGS. 2 and 4 describe example operations and/or methods associated with training or applying a trained machine learning model to input predictions. The operations and/or methods described with reference to FIGS. 2 and 4 may be performed by processing logic that may comprise hardware (e.g., circuitry, dedicated logic, programmable logic, microcode, etc.), software (e.g., instructions run on a processing device to perform hardware simulation), or a combination thereof. These methods and/or operations may be implemented, for example, by one or more OTA ML module 140 executing on a processing device 502 of computing device 500 shown in FIG. 5.

The training dataset 305 can contain hundreds, thousands, tens of thousands, hundreds of thousands or more anomalies 311 and associated resolution actions 312. Anomalies 311 can be a list of anomalies associated with predicted property values associated with a device in a system (e.g., device 135A-N in system 204 of FIG. 2, or device 135A-X, 110A-M of FIG. 1). Anomalies can include, for example, device error, device failure, suboptimal device performance levels, and/or other known anomalies that can affect the device. The resolution actions 312 can be a list of resolution actions that, when performed, prevent the corresponding anomaly from occurring at a future time period. Resolution actions 312 can include a device reboot, adjusting settings values of the device, and/or switching the device to low-power mode, for example. In embodiments, anomalies 311 and/or resolution actions 312 can be provided as output from the individual machine learning models that predict the particular property value at a future time period. In embodiments, anomalies 311 and/or resolution actions 334 can be provided by a system provider. For example, the provider can provide a list of resolution actions 312 that can be performed on the devices within the system. In embodiments, the training dataset can also include data streams 310A-X, which include data points generated from a device within the system (e.g., devices 135A-X, 110A-M of FIG. 1), and/or anonymized device information (e.g., as provided by a system provider).

To construct the training dataset 305, processing logic generates training input, and target output for the training input. The training input includes a first set of data points from the data streams 310A-X. The first set of data points can include a specified number of data points from a first time period. The target output includes a second set of data points from the data stream 310A-X that corresponds to the property of the device to be predicted by the machine learning model.

In embodiments, the anomalies and/or the resolution actions 312 can be associated with data streams 310A-X received from the device. In embodiments, each action in resolution actions 312 can be associated with an anomaly 311. For example, anomalies 311 can include a device failures associated with a certain predicted property value, and the corresponding resolution action 312 can be to switch to low-power mode.

The training dataset 305 is provided as input to a training module 320 to train an ML model 330. One type of machine learning model 330 that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network and other types of machine learning models may be achieved in a supervised learning manner, which involves feeding a training dataset consisting of labeled inputs through the network or other model, observing its outputs, defining an error (by measuring the difference between the outputs and the label values), and using techniques such as deep gradient descent and back-propagation to tune the weights of the network or other model across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

A training dataset containing hundreds, thousands, tens of thousands, hundreds of thousands or more data points can be used to form the training dataset 305. In embodiments, up to millions of reports of device status, network status, etc. are included in a training dataset. Each data point may include, for example, data relating to event logs, system, network and/or application errors (e.g., bug reports), anonymized user activity data, past system, network and/or device failures, and other data reported by the devices, gateway device, and/or network. The data can also include anonymized customer information data from the system (e.g., from the network provider). The variables in the data can include, but are not limited to, the timeliness of the data (e.g., the delay between the occurrence of the event reported and the time at which the event is reported), the consistency of the data, the completeness of the data, and the reliability of the data. This data may be processed to generate one or multiple training datasets 305 for training of one or more machine learning models 330. The machine learning models 330 may be trained, for example, to output predictions of values of one or more properties of the corresponding device.

In one embodiments, generating a training dataset 305 for a device includes gathering data points from data streams 310A-X as training input, and gathering data points from data streams 310A-X as target output for the training input. The target output may depend on what the ML model 330 will be trained to do. For example, to train a machine learning model to predict a value of a first property of the device, training input can include a joined dataset including the data points, collected during a first time period, of the properties of the device not including the first property of the device, along with the a dataset of the first property to be predicted. The target output for the training input can be the values of the first property of the device to be predicted, collected during a second time period. In embodiments, the target output may also include anomalies 311 corresponding to the certain property values (or value ranges), and/or resolution actions 312 that were performed in response to the device experiencing certain property values (or value ranges). In embodiments, the training dataset 305 can include the effect the resolution actions had on the property values, thus enabling the ML model to learn the best course of action corresponding to particular property values.

To effectuate training, the training dataset 305 is provided as input to the training module 320 to train ML model 330. Prior to inputting a first input into a machine learning model, the machine learning model may be initialized. Processing logic trains the untrained machine learning models based on the training dataset(s) to generate a trained machine learning model 330 that perform various operations as set forth above.

Training may be performed by inputting one or more of the data points into the machine learning model one at a time. Each input may include data from or associated with a device at a point in time. The data that is input into the machine learning model may include a single layer or multiple layers. In some embodiments, a recurrent neural network (RNN) is used. In such an embodiment, a second layer may include a previous output of the machine learning model (which resulted from processing a previous input).

The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to predict a property value, there may be a first class (property value above a threshold value), a second class (property value below a threshold value). Alternatively, or additionally, for an artificial neural network trained to predict the property value, the machine learning model may output a predicted property value. Accordingly, the output may include one or more prediction and/or one or more a probability of an event occurring within a future time period.

Processing logic may then compare the generated prediction and/or other output to the known condition and/or label that was included in the training data item. Processing logic determines an error (i.e., a classification error) based on the differences between the output probability map and/or label(s) and the provided probability map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons," where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the model. After one or more rounds of training, processing logic may determine whether a stopping criterion has been met. A stopping criterion may be a target level of accuracy, a target number of processed data items from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model 330. Testing the model 330 can include performing unit tests, regression tests, and/or integration tests.

Figure 4:
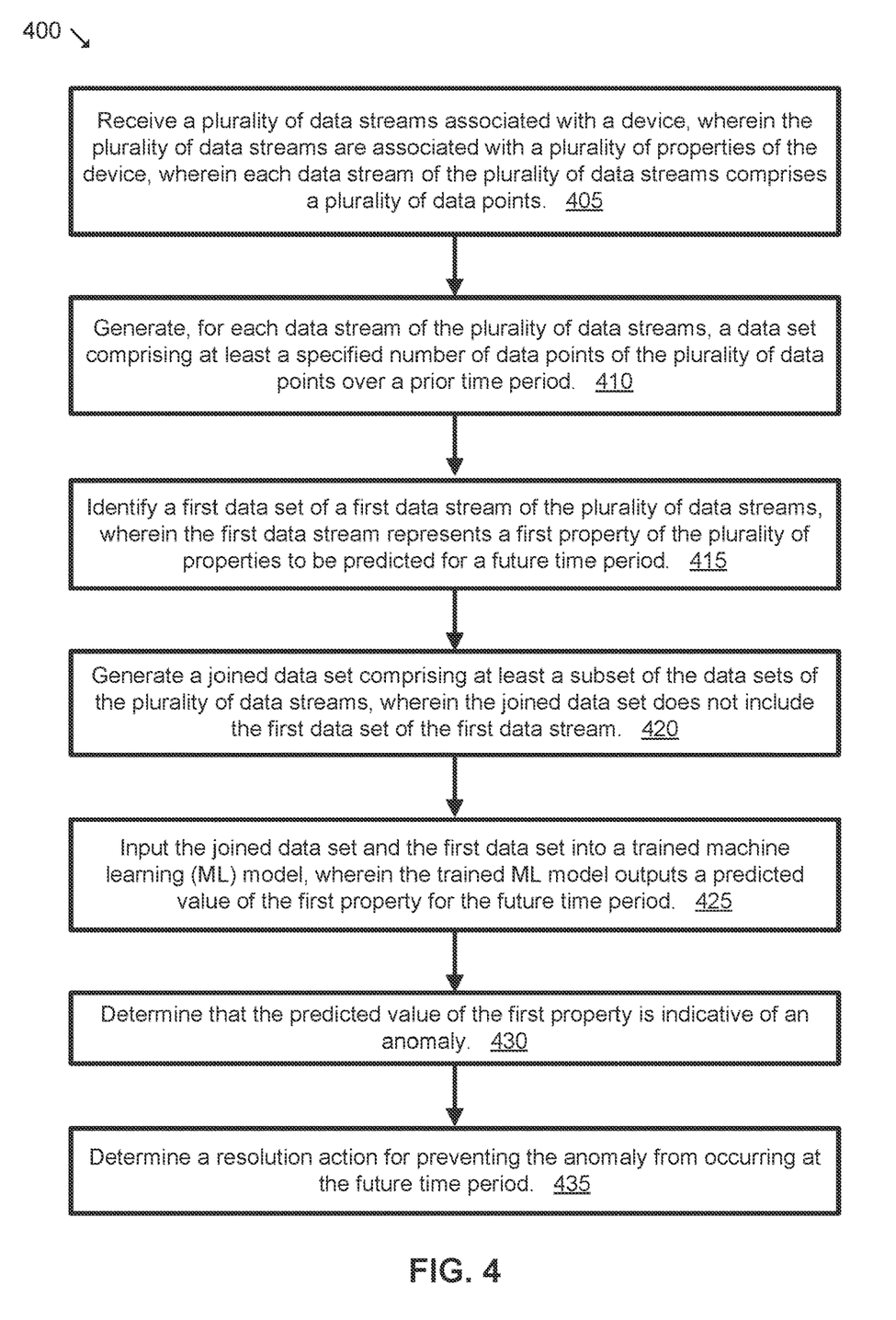
FIG. 4 is a flow chart of an example method for implementing an over-the-air machine learning engine, in accordance with some embodiments of the present disclosure.

FIG. 4 is a flow diagram of a method 400 for implementing an over-the-air machine learning engine, in accordance with embodiments of the present disclosure. The method 400 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 can be performed by OTA ML engine 140 of FIG. 1. Note that the OTA ML engine 140 can perform all or parts of method 400 for multiple devices simultaneously.

At block 405, processing logic receives a plurality of data streams associated with a device. The device can be a client computing device, such as devices 135A-X as described with reference to FIG. 1. In embodiments, the device can be a gateway computing device, such as gateway computing devices 110A-M as described with reference to FIG. 1. In some embodiments, the device can be connected to a gateway computing device. The data can be received from the device itself, from a device managing the device, or can be retrieved from a data store storing the data generated by the device. The device can have a number of device features or properties, and can generate a data stream containing data points for each device feature or property. That is, the plurality of data streams are associated with a plurality of properties of the device, and each data stream include multiple data points.

At block 410, processing logic generates, for each data stream of the plurality of data stream, a data set that includes at least a specified number of data points of the plurality of data points over a prior time period. The specified number of data points can be included in a configuration file, for example, or can be received as input from a user of the device. In embodiments, processing logic determines and/or adjusts the specified number of data points based on the value of the data points received. For example, if the values of the data points do not vary sufficiently from each other, processing logic may determine to increase the specified number of data points to include in the dataset. In embodiments, the data set can include at least the data points generated over the most recent prior time period. Similar to the specified number, the specified prior time period can be included in a configuration file, can be received from a user of the device, and/or can be determined and/or adjusted by the processing logic. As an example, if the number of data points generated in the specified time period does not meet a threshold criterion, or if the values of the data points generated in the specified time period are too similar to each other (e.g., do not exceed a particular range), processing logic can increase the specified time period. Conversely, if the number of data points generated in the specified time period exceeds a threshold criterion, processing logic can decrease the specified time period. Processing logic can normalize the dataset for each data stream, for example, to ensure that each dataset has the same number of data points.

At block 415, processing logic identifies a first data stream of the plurality of data streams. The first data stream represents a first property of the plurality of properties to be predicted for a future time period. The first property can be specified in a configuration file, or can be received as input from a user of the device, for example.

At block 420, processing logic generates a joined data set that includes at least a subset of the data sets of the plurality of data streams. The joined data set may not include the first data set of the first data stream corresponding to the first property to be predicted.

At block 425, processing logic inputs the joined data and the first data set into a trained machine learning (ML) model. The trained ML model outputs a predicted value of the first property for the future time period.

At block 430, processing logic determines that the predicted value of the first property is indicative of an anomaly. At block 435, processing logic determines a resolution action for preventing the anomaly from occurring at the future time period. In embodiments, the trained ML model outputs the anomaly and/or the resolution action for preventing the anomaly from occurring at the future time period. In some embodiments, processing logic identifies a data structure, such as a table. The data structure can list the properties of the device, property values and/or property value ranges, and corresponding device anomalies and/or resolution actions to prevent the anomalies from occurring. Thus, processing logic can identify a first entry in the data structure that corresponds to the predicted value of the first property. Processing logic can identify the corresponding anomaly and/or the corresponding resolution action in the data structure entry. The anomaly can include, for example, a device error, a device failure, and/or suboptimal device performance (e.g., slow performance, reaching a minimum amount level of free storage space, reaching a high temperature, etc.). The resolution action can include, for example, rebooting the device, adjusting a settings value of the device, updating the software installed on the device, putting the device in a low-power mode, or reporting the anomaly and/or predicted value to a user of the device. In some embodiments, the data structure stores resolution actions corresponding to certain property values, or certain property value ranges. For example, the device property to be predicted can be the temperature of the device. The resolution actions corresponding to the device property can include "do nothing" if the predicted temperature value is below a certain value, and "switch to low power mode" if the predicted temperature value is equal to or above the certain value.

In embodiments, processing logic can provide, to the device, an instruction to perform the resolution action. Hence, processing logic automatically and preemptively addresses potential failures or errors that may arise as a result of the predicted property device value. In embodiments, processing logic can schedules the instruction to be executed according to a maintenance window time period. A maintenance window can be a predetermined period of time during which resolution actions may be performed. In embodiments, different resolution actions can have different maintenance windows. For example, a resolution action to reboot the device can be limited to performance between 2 am and 4 am, while a resolution action to switch to low power mode can be performed between 11 pm and 3 am. In embodiments, processing logic can implement a queue manager to schedule the resolution action(s) according to the maintenance window(s).

In embodiments, processing logic can determine the health status of an entire system, e.g., composed of multiple IoT devices. The system can be a mesh network, for example, or can be a computing system that include multiple processing devices. Processing logic can first identify the system that includes the device. Each device in the system can execute a unique ML model to identify a predicted value for the property to be predicted. Processing logic can combine the predicted values identified by each ML model to determine the status of the system. Processing logic can identify a resolution action corresponding go the status of the system. Processing logic can identify the resolution action from a list of resolution actions that each correspond to various predicted value criteria. For example, the combination of predicted values can indicate that a region within the system is predicted to have an unusually high number of incoming requests. The processing logic can identify a recommended resolution action associated with receiving a high volume of requests, such as preemptively shutting down non-essential processes to help ensure that there are sufficient resources available to support the predicted high volume of requests. Processing logic can provide, to the devices within the system, an instruction to execute the resolution action.

Figure 5:
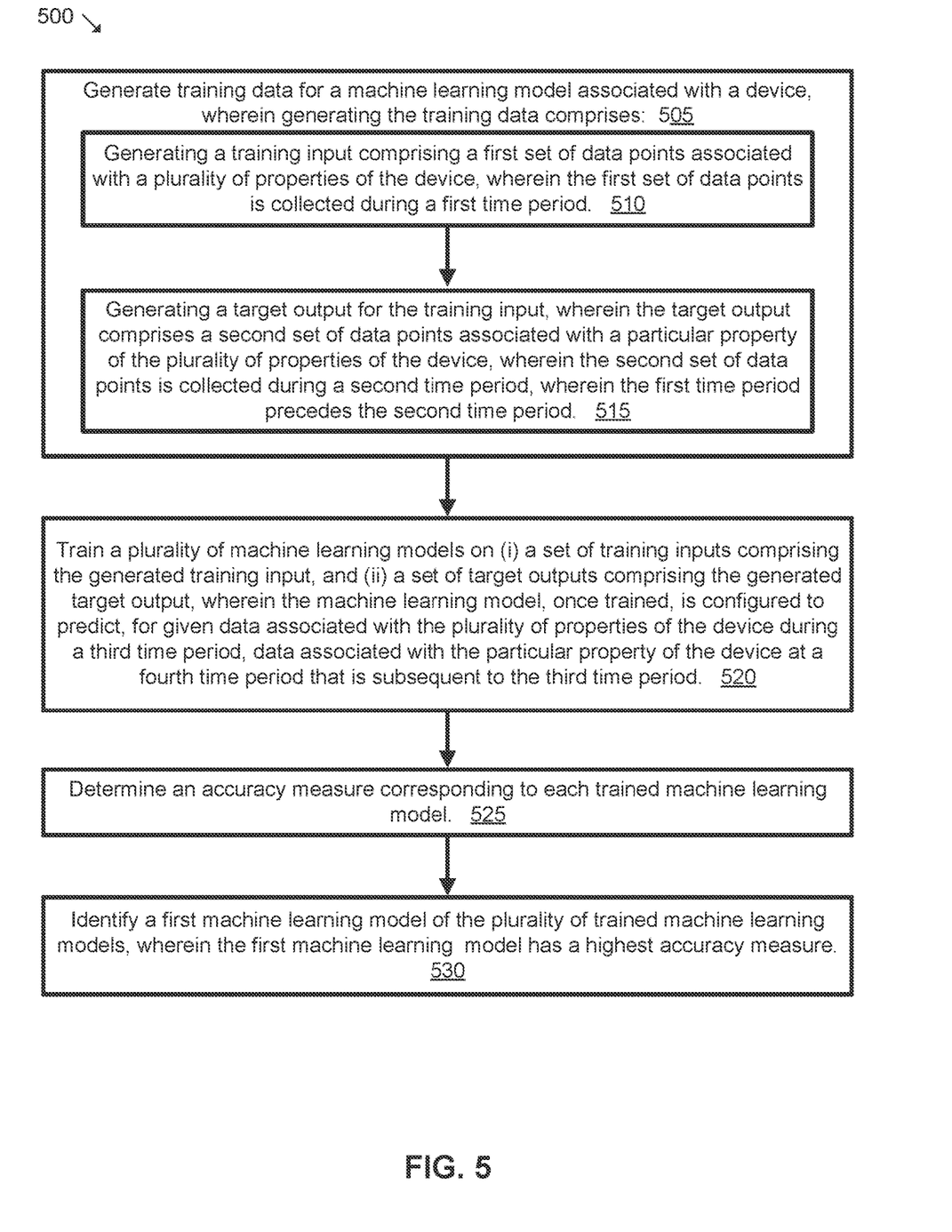
FIG. 5 is a flow chart of an example method for training machine learning models using over-the-air machine learning, in accordance with some embodiments of the present disclosure.

FIG. 5 is a flow diagram of a method 500 for training machine learning models using over-the-air machine learning, in accordance with embodiments of the present disclosure. The method 500 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 500 can be performed by OTA ML engine 140 of FIG. 1. Note that the OTA ML engine 140 can perform all or parts of method 500 for multiple devices simultaneously.

At block 505, processing logic generates training data for a machine learning model associated with a device, wherein generating the training data includes blocks 510 and 515. At block 510, processing logic generates a training input comprising a first set of data points associated with a plurality of properties of a device, wherein the first set of data points is collected during a first time period. In embodiments, the first set of data points includes a specific number of data points during the first time period. Processing logic determines and/or adjusts the specified number of data points based on the value of the data points received. For example, processing logic can identify a subset of the first set of data points; the subset of can correspond to one of the plurality of properties of the device. Processing logic can determine that the values of the data points in the first subset satisfy a similar criterion. The similarity criterion can indicate that the values of the data points are too similar (e.g., are all within a certain range, or are all within a certain percentage of each other). That is, processing logic can determine that values of the data points in the first subset to not sufficiently vary from each other. Responsive to determining that values of the data points in the first subset satisfy a similarity criterion, processing logic adjust the specified minimum number of data points included in the first set of data points, and/or adjusts the duration of the first time period. This can help ensure that the ML model is trained to predict a variety of property values.

At block 515, processing logic generates a target output for the training input, wherein the target output comprises a second set of data points associated with a particular property of the plurality of properties of the device, wherein the second set of data points is collected during a second time period, wherein the first time period precedes the second time period. In embodiments, the duration of the first time period and the duration of the second time period are the same, or substantially similar (e.g., within 1 second of each, or with 10% of each other). In embodiments, the number of data points in the first set of data points and the number of data points in the second set of data points are the same, or substantially the same. In embodiments, processing logic can normalize the first set of data points and the second set of data points to contain the same number of data points.

At block 520, processing logic trains a plurality of machine learning models on (i) a set of training inputs comprising the generated training input, and (ii) a set of target outputs comprising the generated target output, wherein the machine learning model, once trained, is configured to predict, for given data associated with the plurality of properties of the device during a third time period, data associated with the particular property of the device at a fourth time period that is subsequent to the third time period. The predicted data associated with the particular property of the device at the fourth time period can include, for example, a corresponding anomaly, and/or a corresponding resolution action for preventing the anomaly form occurring at the fourth time period. In embodiments, processing logic trains each of the plurality of ML models using a different training algorithm, and/or using varying parameters value for each training algorithm.

At block 525, processing logic determines an accuracy measure corresponding to each of the trained ML models. The accuracy measure can be, for example, a mean absolute percentage error (MAPE) score, or a confidence score. In embodiments, the accuracy measure is calculated during the training of the machine learning model, in which case, at block 525, processing logic identifies the accuracy machine corresponding to the each trained ML model.

At block 530, processing logic identifies a first ML model of the plurality of trained ML models, the identified first ML model having the highest accuracy measure. In embodiments, processing logic can provide the first ML model to the device by sending an executable ML model to the corresponding device. The device can then install and execute the first ML model. In some embodiments, processing logic executes the identified first ML model and sends the output of the identified first ML model to the device.

In embodiments, processing logic can train an updated plurality of ML models on a predetermined schedule (e.g., every few seconds, once every hour, or once every day), and/or in response to a triggering event (e.g., receiving a large volume of data points from a data stream, or upon receiving a user request), and can determine to replace the existing ML model for a particular device. That is, processing logic can generate updated training data and repeat blocks 510-515 using newly received data points from the data streams. Processing logic compare the accuracy measures of the newly trained ML models to identify a newly trained ML model with the highest accuracy measure. Processing logic can then compare the accuracy measure of the newly trained ML model with the highest accuracy measure to the accuracy measure of the existing ML model to determine whether to replace the existing ML model. In embodiments, responsive to determining that the accuracy measure of the newly trained ML model is greater than the accuracy measure of the existing ML model, processing logic can determine to replace the existing ML model with the newly trained ML model.

Figure 6:
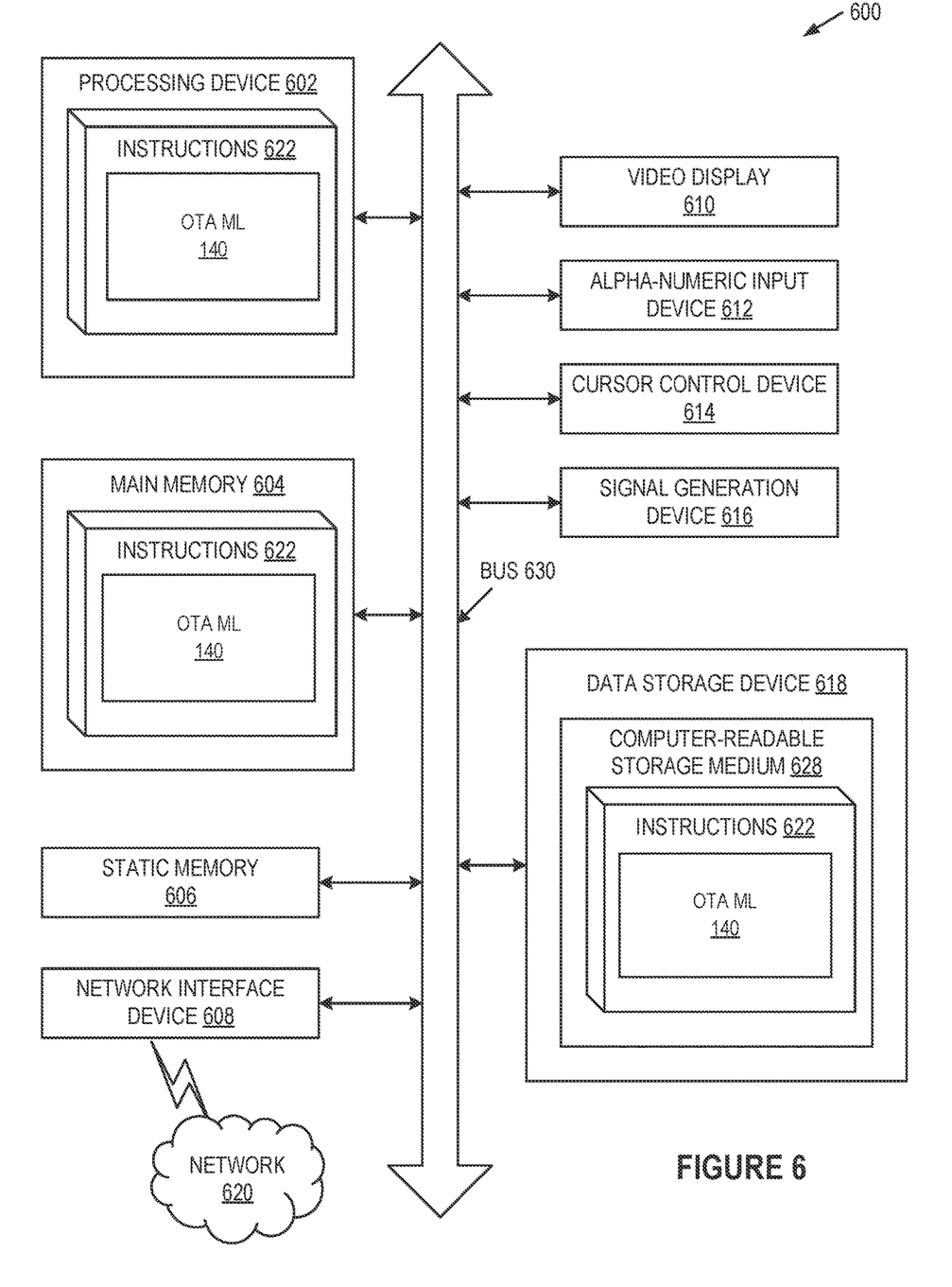
FIG. 6 illustrates a block diagram of an example computing device in which embodiments of the present disclosure may operate.

FIG. 6 illustrates a diagrammatic representation of a machine in the example form of a computing device 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 808. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically a computer-readable storage medium) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The computer-readable storage medium 628 may also be used to store an over-the-air machine learning (OTA ML) module 140 (as described with reference to FIG. 1), and/or a software library containing methods that call a unified recommendation engine module 140. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "selecting", "analyzing", "generating", "performing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a plurality of data streams associated with a device, wherein the plurality of data streams are associated with a plurality of properties of the device, wherein each data stream of the plurality of data streams comprises a plurality of data points;
   generating, for each data stream of the plurality of data streams, a data set comprising at least a specified number of data points of the plurality of data points over a prior time period;
   identifying a first data set of a first data stream of the plurality of data streams, wherein the first data stream represents a first property of the plurality of properties to be predicted for a future time period;
   generating a joined data set comprising at least a subset of the data sets of the plurality of data streams, wherein the joined data set does not include the first data set of the first data stream;
   inputting the joined data set and the first data set into a trained machine learning (ML) model, wherein the trained ML model outputs a predicted value of the first property for the future time period;
   determining that the predicted value of the first property is indicative of an anomaly; and
   determining a resolution action for preventing the anomaly from occurring at the future time period.

2. The method of claim 1, further comprising:
   identifying a data structure, wherein an entry of the data structure comprises a property of the device, a corresponding value range, a corresponding anomaly, and a corresponding resolution action; and
   identifying a first entry in the data structure corresponding to the first property, wherein the predicted value of the first property is within the corresponding value range of the first entry, wherein the anomaly is the corresponding anomaly in the first entry, and wherein the resolution action for preventing the anomaly from occurring is the corresponding resolution action in the first entry.

3. The method of claim 1, wherein the trained machine learning model outputs the resolution action for preventing the anomaly from occurring at the future time period.

4. The method of claim 1, wherein the resolution action comprises of at least one of: rebooting the device, adjusting a settings value of the device, or putting the device in a low-power mode.

5. The method of claim 1, where the anomaly comprises of at least one of: a device error, a device failure, or suboptimal performance of the device.

6. The method of claim 1, further comprising:
   providing, to the device, an instruction to perform the resolution action.

7. The method of claim 1, further comprising:
   scheduling execution of the resolution action according to a maintenance window time period.

8. A system comprising:
   a memory; and
   a processing device coupled to the memory, the processing device to perform operations comprising:
   generating training data for a machine learning model, wherein generating the training data comprises:
      generating a training input comprising a first set of data points associated with a plurality of properties of a device, wherein the first set of data points is collected during a first time period; and
      generating a target output for the training input, wherein the target output comprises a second set of data points associated with a particular property of the plurality of properties of the device, wherein the second set of data points is collected during a second time period, wherein the first time period precedes the second time period; and
   training the machine learning model on (i) a set of training inputs comprising the generated training input, and (ii) a set of target outputs comprising the generated target output, wherein the machine learning model, once trained, is configured to predict, for given data associated with the plurality of properties of the device during a third time period, data associated with the particular property of the device at a fourth time period that is subsequent to the third time period.

9. The system of claim 8, wherein the processing device is to perform operations further comprising:
   training a plurality of machine learning models on (i) the set of training inputs comprising the generated training input, and (ii) the set of target outputs comprising the generated target output, wherein each machine learning model has a corresponding accuracy measure; and
   identifying a first machine learning model of the plurality of machine learning models, wherein the first machine learning model has a highest accuracy measure.

10. The system of claim 9, wherein the accuracy measure comprises a mean absolute percentage error value.

11. The system of claim 8, wherein the processing device is to perform operations further comprising:
generating updated training data for a second machine learning model, wherein generating the updated training data comprises:
generating an updated training input comprising a third set of data points associated with the plurality of properties of the device, wherein the third set of data points is collected during a fifth time period;
generating an updated target output for the updated training input, wherein the updated target output comprises a fourth set of data points associated with the particular property of the plurality of properties of the device, wherein the fourth set of data points is collected during a sixth time period, wherein the fifth time period precedes the sixth time period;
training the second machine learning model on (i) an updated set of training inputs comprising the updated generated training input, and (ii) an updated set of target outputs comprising the updated generated target output, wherein the second machine learning model, once trained, is configured to predict, for updated given data associated with the plurality of properties of the device during a seventh time period, data associated with the particular property of the device at an eighth time period that is subsequent to the seventh time period;
identifying a first accuracy measure of the machine learning model, and a second accuracy measure of the second machine learning model; and
responsive to determining that the second accuracy measure is greater than the first accuracy measure, replacing the machine learning model with the second machine learning model.

12. The system of claim 8, wherein the predicted data associated with the particular property of the device at the fourth time period comprises at least one of: a corresponding anomaly or a corresponding resolution action for preventing the anomaly from occurring at the fourth time period.

13. The system of claim 8, wherein the processing device is to perform operations further comprising:
identifying a subset of the first set of data points, wherein the subset corresponds to one of the plurality of properties of the device; and
responsive to determining that values of the data points in the first subset satisfy a similarity criterion, adjusting at least one of: a minimum number of data points included in the first set of data points, or a duration of the first time period.

14. A non-transitory computer readable storage medium comprising instructions that, when executed by a processing device, cause the processing device to perform operations comprising:
receiving a plurality of data streams associated with a device, wherein the plurality of data streams are associated with a plurality of properties of the device, wherein each data stream of the plurality of data streams comprises a plurality of data points;
generating, for each data stream of the plurality of data streams, a data set comprising at least a specified number of data points of the plurality of data points over a prior time period;
identifying a first data set of a first data stream of the plurality of data streams, wherein the first data stream represents a first property of the plurality of properties to be predicted for a future time period;
generating a joined data set comprising at least a subset of the data sets of the plurality of data streams, wherein the joined data set does not include the first data set of the first data stream;
inputting the joined data set and the first data set into a trained machine learning (ML) model, wherein the trained ML model outputs a predicted value of the first property for the future time period;
determining that the predicted value of the first property is indicative of an anomaly; and
determining a resolution action for preventing the anomaly from occurring at the future time period.

15. The non-transitory computer readable storage medium of claim 14, the operations further comprising:
identifying a data structure, wherein an entry of the data structure comprises a property of the device, a corresponding value range, a corresponding anomaly, and a corresponding resolution action; and
identifying a first entry in the data structure corresponding to the first property, wherein the predicted value of the first property is within the corresponding value range of the first entry, wherein the anomaly is the corresponding anomaly in the first entry, and wherein the resolution action for preventing the anomaly from occurring is the corresponding resolution action in the first entry.

16. The non-transitory computer readable storage medium of claim 14, wherein the trained machine learning model outputs the resolution action for preventing the anomaly from occurring at the future time period.

17. The non-transitory computer readable storage medium of claim 14, wherein the resolution action comprises of at least one of: rebooting the device, adjusting a settings value of the device, or putting the device in a low-power mode.

18. The non-transitory computer readable storage medium of claim 14, where the anomaly comprises of at least one of: a device error, a device failure, or suboptimal performance of the device.

19. The non-transitory computer readable storage medium of claim 14, further comprising:
providing, to the device, an instruction to perform the resolution action.

20. The non-transitory computer readable storage medium of claim 14, further comprising:
scheduling execution of the resolution action according to a maintenance window time period.

* * * * *